(No Model.)

H. F. POORE.
GROOVING SAW.

No. 489,206. Patented Jan. 3, 1893.

WITNESSES.
F. Dean Rhodes.
James A. Walsh.

INVENTOR.
Henry F. Poore,
per C. & E. W. Bradford,
ATTORNEYS.

UNITED STATES PATENT OFFICE.

HENRY F. POORE, OF INDIANAPOLIS, INDIANA, ASSIGNOR TO ELIAS C. ATKINS, OF SAME PLACE.

GROOVING-SAW.

SPECIFICATION forming part of Letters Patent No. 489,206, dated January 3, 1893.

Application filed April 28, 1890. Serial No. 349,766. (No model.)

*To all whom it may concern:*

Be it known that I, HENRY F. POORE, a citizen of the United States, residing in Indianapolis, in the county of Marion and State of Indiana, have invented certain new and useful Improvements in Grooving-Saws, of which the following is a specification.

My said invention relates to a modification in the construction of the saw which forms the subject-matter of my application Serial No. 330,904, whereby it is particularly adapted for cutting grooves.

Figure 1:
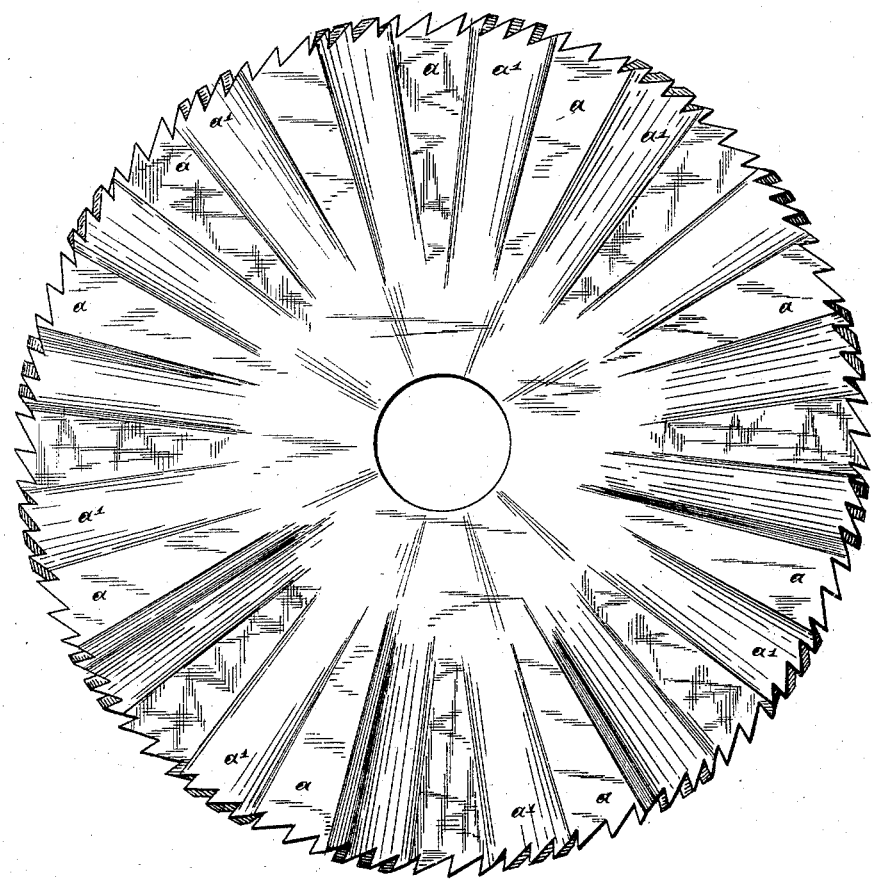
Figure 2:
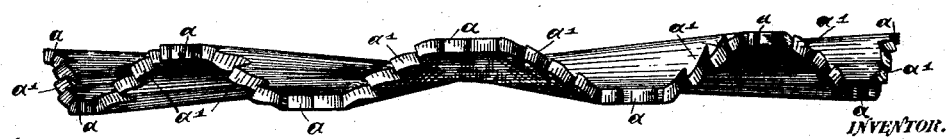

Referring to the accompanying drawings, which are made a part hereof, and on which similar letters of reference indicate similar parts, Figure 1. is a side elevation of a saw of said modified form, and Fig. 2. an edge view thereof.

This saw is constructed by pressing a saw plate of the proper form between dies so as to form corrugations therein, the corrugations being of a depth sufficient to enable the saw to cut the width of groove desired, and the top or highest point of each corrugation being flattened by the form of the die, or by grinding, to form a short straight surface which will cut the side wall of the groove smooth and straight. In the drawings these flat or straight portions are indicated by the letter of reference $a$, and the inclined portions connecting them, by the letter of reference $a'$. The edge thus formed is continuously toothed and a saw thus provided which is operative throughout its periphery.

The operation of this saw is similar to that of other well-known grooving saws,—the straight portions cutting the side walls of the groove, and the inclined portions removing the wood intervening between said sides.

Having thus fully described my said invention, what I claim as new, and desire to secure by Letters Patent, is;—

1. A grooving saw, having a continuous toothed or cutting edge composed of straight sectors lying in different planes and connected by sectors in planes at an angle thereto, substantially as set forth.

2. A grooving saw the edge of which is continuously toothed and composed of straight and inclined sectors, substantially as set forth.

3. A grooving saw consisting of a circular plate with corrugations running to the edge thereof, the top of which corrugations are flattened or made straight, and the edge thereof being continuously toothed, substantially as set forth.

In witness whereof I have hereunto set my hand and seal, at Indianapolis, Indiana, this 4th day of March, A. D. 1890.

HENRY F. POORE. [L. S.]

Witnesses:
E. W. BRADFORD,
JAMES A. WALSH.